United States Patent
Hasegawa et al.

(10) Patent No.: US 6,336,069 B1
(45) Date of Patent: Jan. 1, 2002

(54) FRONT AND REAR WHEEL LOAD DISTRIBUTION CONTROL UNIT FOR COUPLED VEHICLE

(75) Inventors: Nobuki Hasegawa, Tokyo; Hitoshi Nakanishi, Oyama, both of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/572,934

(22) Filed: May 18, 2000

(30) Foreign Application Priority Data

May 20, 1999 (JP) .................................. 11-140268

(51) Int. Cl.[7] .................................. B60K 17/35
(52) U.S. Cl. ....................... 701/69; 180/197; 180/241
(58) Field of Search ................... 701/69, 1; 180/191, 180/241, 247, 243, 249, 250

(56) References Cited

U.S. PATENT DOCUMENTS

| 4,113,044 A | 9/1978 | Williams et al. ............... 180/51 |
| 5,088,762 A | * 2/1992 | Fukuyama et al. ....... 280/5.508 |
| 6,089,679 A | * 7/2000 | Kushi et al. ............... 303/113.5 |

FOREIGN PATENT DOCUMENTS

| EP | 0 168 775 A1 | 1/1986 |
| GB | 2 175 260 A | 11/1986 |
| JP | 8-337125 | 12/1996 |
| JP | 9-254831 | 9/1997 |

* cited by examiner

Primary Examiner—William A. Cuchlinski, Jr.
Assistant Examiner—Marthe Marc-Coleman
(74) Attorney, Agent, or Firm—Armstrong, Westerman, Hattori, McLeland & Naughton, LLP.

(57) ABSTRACT

A front and rear wheel load distribution control unit which provides excellent driving operability of a coupled vehicle and improves durability of a driving unit. To this end, the control unit is a front and rear wheel load distribution control unit for a coupled vehicle with a front vehicle (1) and a rear vehicle (3) being coupled, including an inter-axle differential lock (71) between a front axle (91) and a rear axle (92) for eliminating a rotational differential between the front axle (91) and the rear axle (92), and includes a crossing angle detecting sensor (33) for detecting a crossing angle of the front vehicle (1) and the rear vehicle (3), a front axle rotation sensor (31) for detecting rotation of the front axle (91), a rear axle rotation sensor (32) for detecting rotation of the rear axle (92), and control means (20, 20a, 20b, 36) for operating the inter-axle differential lock (71) in response to a crossing angle signal from the crossing angle detecting sensor (33), a rotation signal from the front axle rotation sensor (31), and a rotation signal from the rear axle rotation sensor (32).

4 Claims, 6 Drawing Sheets

FRONT AND REAR WHEEL LOAD DISTRIBUTION CONTROL UNIT FOR COUPLED VEHICLE

TECHNICAL FIELD

The present invention relates to a front and rear wheel load distribution control unit for a coupled vehicle.

BACKGROUND ART

A coupled vehicle, for example, an articulated dump truck as shown in FIG. 5 includes a vertical shaft for articulation at a coupling element between a front vehicle body 1 having a driver's cab and a rear vehicle body 3 having a dump body 5 capable of dumping earth, and it also has a horizontal shaft in a longitudinal direction (for example, refer to Japanese Patent Application Laid-open No. 9-254831). The dump truck is allowed to turn around the horizontal shaft, specifically, it is capable of oscillating so as to have improved adhesion of front and rear wheels during traveling and excellent stability of a vehicle body.

The front vehicle body 1 having front wheels 2 and a rear vehicle body 3 having rear wheels 4 are coupled by means of a coupling device 10 being an oscillation device. The front vehicle body 1 is provided with the driver's cab, and the rear vehicle body 3 is mounted with the dump body 5 loaded with earth and sand or the like. During earth dumping, the dump body 5 is dumped rearward by a dump cylinder not illustrated to discharge earth as shown by the two-dot chain line.

FIG. 6 is an explanatory view of the coupling device 10 in FIG. 5. One end of a coupling member 11 is attached to the front vehicle body 1 so as to be rotatable around a horizontal axis X—X in the longitudinal direction as shown by the arrow, that is, so as to be able to oscillate. A rear vehicle body frame 7 is attached to the other end of the coupling member 11 so as to be rotatable around a vertical axis Y—Y.

FIG. 7 is a plan view of the articulated dump truck. When the dump truck turns during traveling, the front vehicle body 1 is turned around the vertical axis Y—Y (See FIG. 6) to the right (or left) as shown by the two-dot chain line as shown in FIG. 7 to make a turn.

The above articulated dump truck has an all-wheel-drive unit which drives all wheels as shown in FIG. 8. The drive unit is provided with an inter-axle differential 53 for absorbing rotation differentials between the front wheels 2 and the rear wheels 4, and an inter-axle differential lock 71 for locking the inter-axle differential 53 so as to allow the front wheels 2 and the rear wheels 4 to drive without a rotation differential in order to prevent the front wheels 2 or the rear wheels 4 from skidding on a soft ground. The drive unit is also provided with a front differential 54 and rear differentials 56 and 58 for absorbing the rotation differentials between left and right wheels, and differential locks 72, 73, and 74 for locking the front differential 54, and the rear differentials 56 and 58 so as to allow the left and right wheels to drive without rotation differentials in order to prevent either left wheel or right wheel from skidding on a soft ground.

Next, the details of the drive unit will be explained. An output shaft of an engine 50 connects to an input shaft of a torque converter 51a, and an output shaft of the torque converter 51a connects to an input shaft of a transmission 51. An output shaft of the transmission 51 connects to a transfer device 52 for distributively transferring output power to a front axle 91, and a front rear axle 92 and a back rear axle 93 which are rear axles. The transfer device 52 connects to the front axle 91 via a front propeller shaft 95 in front and connects to the front rear axle 92 via a first rear propeller shaft 96 and a second rear propeller shaft 94 in the rear. By this connection, the output power of the engine 50 is distributively transferred to the front wheels 2 and the rear wheels 4 finally by gears inside the transfer device 52. A gear box 55 and a gear box 57 respectively connect to the front rear axle 92 and the back rear axle 93 via a back rear propeller shaft 97.

The transfer device 52 is provided with the inter-axle differential 53 as a differential in order to transfer input power, dividing it into output powers to the front wheels 2 and the rear wheels 4 and to absorb the rotation differential between the front wheel 2 and the rear wheel 4. The transfer device 52 is provided with the inter-axle differential lock 71 for fixing the inter-axle differential 53 to bring the differential to a non-operation state.

The front side of the inter-axle differential 53 connects to the front differential 54 being a differential. The front differential 54 is provided with the front differential lock 72 for fixing the front differential 54 to bring the differential to a non-operation state. An output shaft of the front differential 54 connects to left and right final reduction gears 84, to which the front wheels 2 are mounted. The front axle 91 is provided with front brakes 81 for braking the front wheels 2.

The rear side of the inter-axle differential 53 connects to the front rear differential 56 being a differential via the gear box 55 of the front rear axle 92 being one of the rear axles. The front rear differential 56 is provided with the front rear differential lock 73 for fixing the front rear differential 56 to bring the differential to a non-operation state. An output shaft of the front rear differential 56 connects to left and right final reduction gears 85, to which the rear wheels 4 are mounted. The front rear axle 92 is provided with front rear brakes 82 for braking the rear wheels 4.

The front rear axle 92 connects to the back rear differential 58 being a differential of the back rear axle 93 being the other one of the rear axles via the gear boxes 55 and 57. The back rear differential 58 is provided with the back rear differential lock 74 for fixing the back rear differential 58 to bring the differential to a non-operation state. An output shaft of the back rear differential 58 connects to left and right final reduction gears 86, to which the rear wheels 4 are mounted. The back rear axle 93 is provided with back rear brakes 83 for braking the rear wheels 4.

The inter-axle differential lock 71, the front differential lock 72, the front rear differential lock 73, and the back rear differential lock 74, which bring the respective differentials to a non-operational state, fix gears 53a, 54a, 56a and 58a of the respective differentials, and pinion gears 53b, 54b, 56b and 58b on one side with such means as an oil hydraulic clutch. For example, an inter-axle differential lock clutch 71c of the inter-axle differential lock 71 is engaged by oil pressure to thereby fix the gear 53a and the pinion 53b. Consequently, when the inter-axle differential lock 71, the front differential lock 72, the front rear differential lock 73, and the back rear differential lock 74 are operated, the gears 53a, 54a, 56a and 58a of the respective differentials, the pinion gears 53b, 54b, 56b and 58b on one side, and pinion gears 53c, 54c, 56c and 58c on the other side are fixed, and thus no rotational differentials occur among them.

When the above articulated dump truck turns during traveling, as shown in FIG. 9, the front vehicle body 1 and the rear vehicle body 3 cross at the coupling element 10 to form a crossing angle of Sa. Generally, in an articulated dump truck as above, the rear vehicle body 3 is longer than the front vehicle body 1, and as a result, a distance L2 between the axis of the rear wheels 4 and the coupling element 10 is longer than a distance L1 between the axis of the front wheels 2 and the coupling element 10. Consequently, as for an outer turning radius from a center of turning Co, an outer turning radius R1 of the front wheel 2 is longer than an outer turning radius R3 of the rear wheel 4. On the other hand, as for an inner turning radius from a center of turning Co, an inner turning radius R2 of the front wheel 2 is longer than an inner turning radius R4 of the rear wheel 4.

Naturally, the outer turning radiuses R1 and R3 of the front wheel 2 and the rear wheel 4 are longer than inner turning radiuses R2 and R4. Accordingly, when the coupled vehicle turns during traveling, a rotational differential occurs between an outer wheel 2o and an inner wheel 2i of the front wheels 2, and rotational differentials also occur between an outer wheel 4o and an inner wheel 4i of the rear wheels 4. These rotational differentials are absorbed by the front differential 53 and the rear differential 56. The front propeller shaft 95 leading to the front axle 91 has a rotational speed corresponding to the average rotational speed of the outer wheel 2o and the inner wheel 2i of the front wheels 2. The first rear propeller shaft 96 leading to the rear axle 92 has a rotational speed corresponding to the average rotational speed of the outer wheel 4o and the inner wheel 4i of the rear wheels 4.

However, the outer turning radius R1 of the front wheel 2 is longer than the outer turning radius R3 of the rear wheel 4, and the inner turning radius R2 of the front wheel 2 is longer than the inner turning radius R4 of the rear wheel 4. Therefore, the rotational speed of the front propeller shaft 95 to the front axle 91 is higher than that of the first rear propeller shaft 96 to the rear axle 92. As a result, a rotational speed differential occurs between the front propeller shaft 95 and the first rear propeller shaft 96. The speed differential is absorbed by the inter axle differential 53. Consequently, even if the articulated dump truck, which is a coupled vehicle, turns during traveling, load caused by the rotational speed differential between the rotational speed of the front axle 91 and the rotational speed of the rear axle 92 does not occur to the drive unit, and thereby the dump truck can turn smoothly.

However, when the articulated dump truck being a coupled vehicle as above turns during traveling on a muddy ground or a wasteland, a disadvantage arises. Specifically, on turning as above, if the road surface is muddy and soft, the frictional force between the wheels and the road surface reduces, even if the dump truck travels with the rotational speed differentials between the front axle 91 and the rear axle 92 being absorbed by the inter-axle differential 53. As a result, even with an all-wheel drive, the driving force is not transferred to the road surface, and for example the front wheels skid with the front axle 91 idling. Then the front vehicle body 1 is pressed in a direction to which the rear vehicle body 3 faces by the driving force of the rear axle 92, and the vehicle does not turn. In addition, the driving force is used for idling the front axle 91, namely, for causing the front wheels 2 to skid, and thus it is wasted without being used for moving the vehicle.

In such a case, in order to prevent the front axle 91 or the rear axle 92 from idling, it is suitable to operate the interaxle differential lock 71 for locking the inter-axle differential 53 so that the front axle 91 and the rear axle 92 can drive without a rotational speed differential. However, it is troublesome for an operator to frequently perform operations of effecting and stopping the operation of the inter-axle differential lock 71. For this reason, the operator cannot concentrate attention on a turning operation of the vehicle on a wasteland or a muddy ground, which easily leads to unstable traveling, thus decreasing operability of the vehicle.

When the timing of operating the inter-axle differential lock 71 is not proper and it is operated on a hard ground, the differential mechanism does not work, and rotational speed differentials between the front axle 91 and the rear axle 92 are not absorbed. As a result, undue load is exerted on the drive unit, thereby reducing durability of the gears, bearings and propeller shafts of the driving unit, and the tires are forcibly rotated to skid, thereby increasing wear in the tires.

SUMMARY OF THE INVENTION

The present invention is made in view of the above disadvantages, and its object is to provide a front and rear wheel load distribution control unit for a coupled vehicle which provides excellent operability in driving the coupled vehicle, and which increases durability of a driving unit.

In order to attain the above object, a first aspect of a front and rear wheel load distribution control unit for a coupled vehicle according to the present invention is a front and rear wheel load distribution control unit for a coupled vehicle with a front vehicle and a rear vehicle being coupled, including an inter-axle differential lock between a front axle and a rear axle for eliminating a rotational differential between the front axle and the rear axle, and includes a crossing angle detecting sensor for detecting a crossing angle of the front vehicle and the rear vehicle, a front axle rotation sensor for detecting rotation of the front axle, a rear axle rotation sensor for detecting rotation of the rear axle, and control means for operating the inter-axle differential lock in response to a crossing angle signal from the crossing angle detecting sensor, a rotation signal from the front axle rotation sensor, and a rotation signal from the rear axle rotation sensor.

According to the above configuration, when the coupled vehicle turns during traveling on a wasteland such as a muddy ground, the inter-axle differential lock is automatically operated corresponding to the rotational speed differential between the front axle and the rear axle, and the crossing angle. As a result, the front axle and the rear axle do not idle, and the wheels do not skid, thus enabling the vehicle to smoothly turn. Consequently, the driving operability of the coupled vehicle is improved. Further, the inter-axle differential being a differential between the front and rear axles operates automatically and properly, and absorbs the rotational speed differentials between the front and rear axles, thus improving the durability of the drive unit of the coupled vehicle.

A second aspect of a front and rear wheel load distribution control unit for a coupled vehicle according to the present invention is a front and rear wheel load distribution control unit for a coupled vehicle with a front vehicle and a rear vehicle being coupled, including an inter-axle differential lock between a front axle and a rear axle for eliminating a rotational differential between the front axle and the rear axle, and includes a crossing angle detecting sensor for detecting a crossing angle of the front vehicle and the rear vehicle, a front axle rotation sensor for detecting rotation of the front axle, a rear axle rotation sensor for detecting rotation of the rear axle, and control means which obtain a rotational speed differential between the front axle and the rear axle and a theoretical value of the rotational speed differential between the front axle and the rear axle according to the crossing angle, or which obtains a rotational speed ratio between the front axle and the rear axle and a theoretical value of the rotational speed ratio between the front axle and the rear axle according to the crossing angle, based on a crossing angle signal from the crossing angle detecting sensor, a rotation signal from the front axle rotation sensor, and a rotation signal from the rear axle rotation sensor, and which operates the inter-axle differential lock when an absolute value of the differential between the obtained rotational speed differential and the obtained theoretical value of the rotational speed differential exceeds a first rotational speed differential threshold value, or when an absolute value of the differential between the obtained rotational speed ratio and the obtained theoretical value of the rotational speed ratio exceeds a first rotational speed ratio threshold value.

According to the above configuration, when the coupled vehicle turns during traveling on a wasteland such as a muddy ground, i) the rotational speed differential between the front and rear axles, and the theoretical value of the rotational speed differential between the front and rear axles according to the crossing angle are obtained, or ii) the rotational speed ratio between the front and rear axles, and the theoretical value of the rotational speed ratio between the front and rear axles according to the crossing angle are obtained. As a result of obtaining them, if the absolute value of the differential between the rotational speed differential and the theoretical value of the rotational speed differential exceeds the first rotational speed differential threshold value, or if the absolute value of the differential between the rotational speed ratio and the theoretical value of the rotational speed ratio exceeds the first rotational speed ratio threshold value, the inter-axle differential lock is automatically operated. As a result, the front and rear axles do not idle, and the wheels do not skid, thus enabling the vehicle to smoothly turn. Consequently, driving operability of the coupled vehicle is improved. If the absolute value of the differential between the rotational speed differential and the theoretical value of the rotational speed differential does not exceed the first rotational speed differential threshold value, or if the absolute value of the differential between the rotational speed ratio and the theoretical value of the rotational speed ratio does not exceed the first rotational speed ratio threshold value, the inter-axle differential lock is not operated. As a result, the inter-axle differential being a differential between the front and rear axles is operated properly, and absorbs the rotational speed differential between the front and rear axles, thus improving the durability of the driving unit for the coupled vehicle.

In the control unit according to the present invention, the control means may further output a signal for reducing an engine speed of the coupled vehicle by a predetermined value when an absolute value of the differential between the obtained rotational speed differential and the obtained theoretical value of the rotational speed differential exceeds a second rotational speed differential threshold value which is larger than the first rotational speed differential threshold value, or when an absolute value of the differential between the obtained rotational speed ratio and the obtained theoretical value of the rotational speed ratio exceeds a second rotational speed ratio threshold value which is larger than the first rotational speed ratio threshold value.

According to the above configuration, the engine speed of the coupled vehicle is automatically reduced when the absolute value of the differential between the rotational speed differential and the theoretical value of the rotational speed differential exceeds the second rotational speed differential threshold value, or the absolute value of the differential between the rotational speed ratio and the theoretical value of the rotational speed ratio exceeds the second rotational speed ratio threshold value. As a result, the rotational speed of the front axle or the rear axle reduces, idling of the front axle or the rear axle is decreased by the degree of speed reduction, wear of the tires can be reduced, and the engine fuel consumption amount can be reduced.

Further, in the control unit according to the present invention, the control means may increase and decrease the magnitude of an operation signal for the inter-axle differential lock stepwise.

According to the above configuration, since the inter-axle differential lock is operated stepwise, shock occurring to the coupled vehicle can be reduced and hunting in which operation and non-operation of the inter-axle differential lock are repeated can be prevented. Consequently, smooth driving operability can be provided.

BEST MODE FOR CARRYING OUT THE INVENTION

Preferred embodiments according to the present invention will be explained below with reference to the drawings. The components explained in the prior art are given the same numerals and symbols, and the explanation thereof will be omitted.

Figure 1:
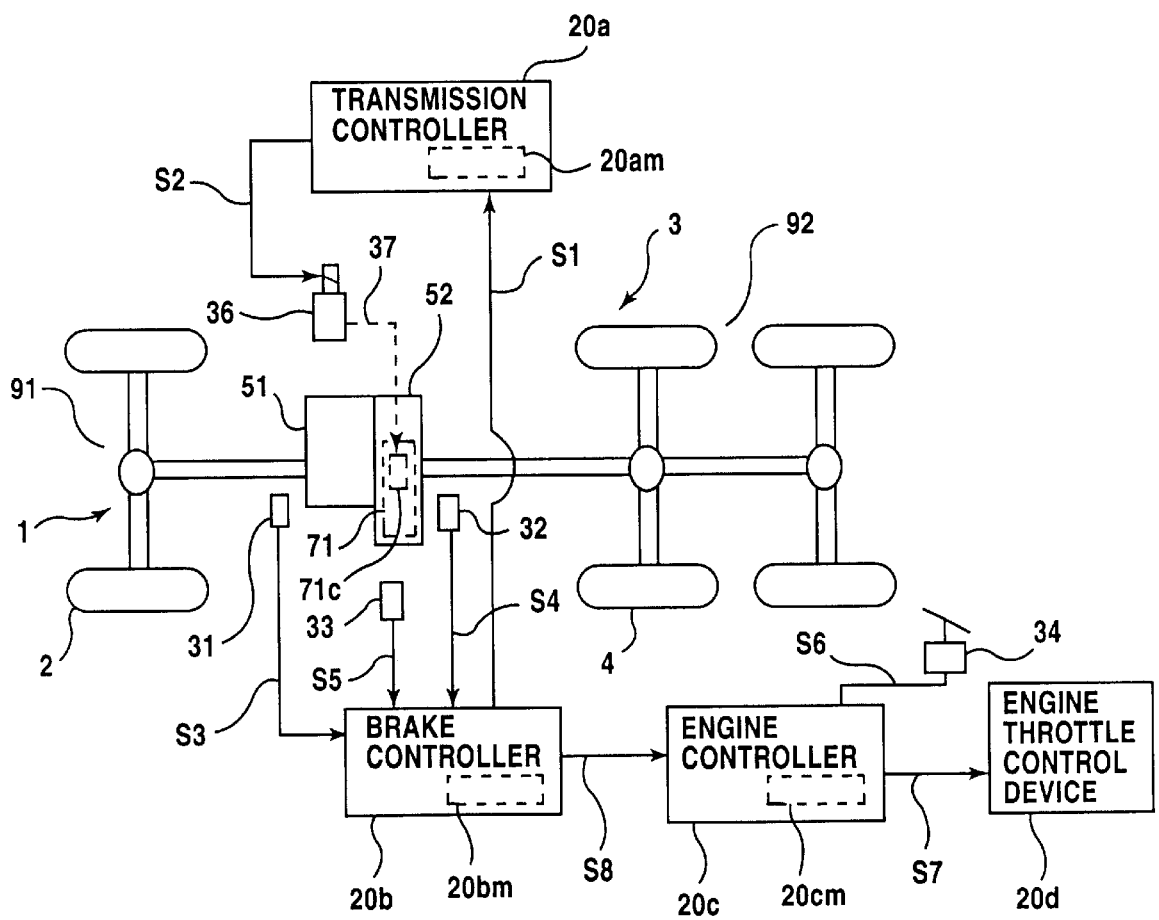
FIG. 1 is a block diagram of a hardware configuration of a first embodiment of the present invention.

A first embodiment will be explained based on FIG. 1 to FIG. 3. FIG. 1 shows a block diagram of a hardware configuration of a front and rear wheel load distribution control unit of the present invention. A transmission controller 20a selects a speed gear of a transmission 51 in response to a gear shift signal from a speed change lever (not illustrated) manipulated by an operator.

A signal line S1 to which an inter-axle differential lock signal from a brake controller 20b disposed at a front vehicle body 1 is inputted is connected to the transmission controller 20a disposed at the front vehicle body 1. A signal line S2 for transmitting a signal to operate an inter-axle differential lock valve 36 from the transmission controller 20a is connected to the inter-axle differential lock valve 36 disposed at the transmission 51.

The inter-axle differential lock valve 36 is an electromagnetic proportional control valve, which controls the opening of the valve in accordance with the magnitude of a current value to thereby control the pressure of pressure oil. The inter-axle differential lock valve 36 supplies pressure oil to an inter-axle differential lock clutch 71c of an inter-axle differential lock 71 provided in a transfer device 52 connecting to the transmission 51 to thereby operate the inter-axle differential lock 71.

To the brake controller 20b, connected are a signal line S3 to which a rotation signal is inputted from a front axle rotation sensor 31 provided in the vicinity of an output shaft in front of the transfer device 52 to detect a rotational speed Nf of an input shaft of a front axle 91, and a signal line S4 to which a rotation signal from a rear axle rotation sensor 32 for detecting a rotational speed Nr of a rear axle 92 provided in the vicinity of an output shaft at the rear of the transfer device 52 is inputted.

The front axle rotation sensor 31 and the rear axle rotation sensor 32 are each, for example, a noncontacting type of electromagnetic sensor or photoelectric sensor, and always detect rotational frequency of the output shaft in front of and at the rear of the transfer device 52. A signal line S5 to which a crossing angle signal is inputted from a crossing angle sensor 33 provided in the vicinity of a coupling element 10 for a front vehicle body 1 and a rear vehicle body 3 is connected to the brake controller 20b. The crossing angle sensor 33 is, for example, a potentiometer, and is provided so that its center of rotation is aligned with a vertical axis Y—Y of the coupling element 10 to detect the crossing angle of the front vehicle body 1 and the rear vehicle body 3.

The brake controller 20b performs filter processing for cutting a noise in the rotation signal, and always monitors the rotational speeds of the front axle 91 and the rear axle 92. In accordance with the rotation signal and the crossing signal, the brake controller 20b transmits the inter-axle differential lock signal to the transmission controller 20a, and transmits an engine throttle corrective signal to an engine controller 20c disposed at the front vehicle body 1.

Figure 8:
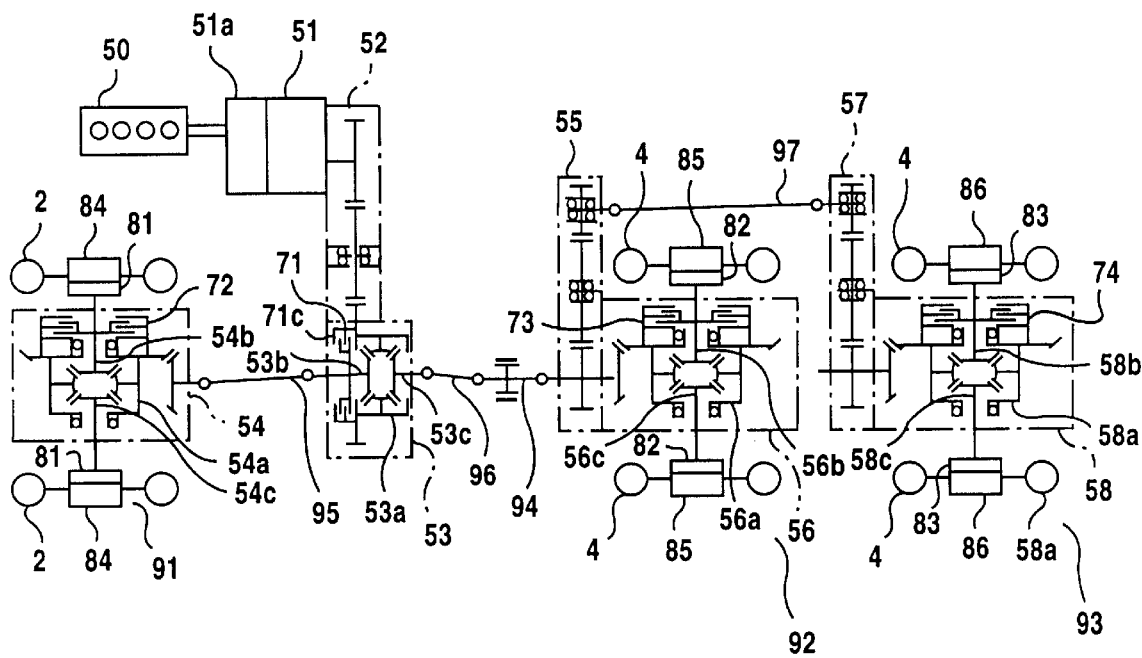
FIG. 8 is a diagram showing a drive unit for a conventional coupled vehicle.

A signal line S6 to which an accelerator signal is inputted from an accelerator pedal 34 operated by the operator is connected to the engine controller 20c. To an engine throttle control device 20d, connected is a signal line S7 for transmitting from the engine controller 20c an engine throttle signal for controlling fuel feed rate and fuel injection timing in correspondence to the acceleration signal to control the speed of an engine 50 (See FIG. 8). The engine throttle control device 20d provided at the engine 50 controls the speed of the engine 50 in accordance with an engine throttle signal. A signal line S8 to which an engine throttle correction signal is inputted from the brake controller 20b is connected to the engine controller 20c.

The transmission controller 20a, the brake controller 20b, and the engine controller 20c each consist of a processor such as a microcomputer, a high-speed math processor or the like, and each have predetermined erasable memories 20am, 20bm, 20cm (so-called RAM) which store thresholds and the like.

As explained above, the transmission controller 20a, the brake controller 20b, and the inter-axle differential lock valve constitute control means for operating the inter-axle differential lock 71 provided at the transfer device 52 connecting to the transmission 51.

A configuration in which the engine controller 20c is added to the aforesaid control means constitutes control means for controlling the speed of the engine 50 in addition to the function of operating the inter-axle differential lock 71. The control means may not be separate controllers as described above, and it goes without saying that the control means may be an integral-type of controller equipped with the respective functions.

Next, the operation of the first embodiment of the front and rear load distribution control unit for the couple vehicle will be explained with a flowchart in FIG. 2.

First, in step S101, in the transmission controller 20a, a command value i is initialized to be "0". The command value i is the value based on which the magnitude of current sent to the inter-axle differential lock valve 36 is determined, and in accordance with the current, the pressure of pressure oil flown from the inter-axle differential lock valve 36 to the inter-axle differential lock clutch 71c is set. Subsequently, in step S102, the front axle rotational speed Nf being the rotational speed of a front propeller shaft 95, which is the rotational speed of the front axle 91, and the rear axle rotational speed Nr being the rotational speed of a first rear propeller shaft 96 which is the rotational speed of the rear axle 92 are respectively computed from a rotation signal from the front axle rotation sensor 31 and a rotation signal from the rear axle rotation sensor 32.

In step S103, the crossing angle Sa of the front vehicle body 1 and the rear vehicle body 3 is computed based on a crossing angle signal from the crossing angle sensor 33 for detecting the crossing angle Sa.

In step S104, based on the front axle rotational speed Nf, the rear axle rotational speed Nr and the crossing angle Sa which are computed in step S102 and step S103, a rotational speed differential $\Delta N$ between the front axle rotational speed Nf and the rear axle rotational speed Nr, specifically, $\Delta N=|Nf-Nr|$ is computed, or a rotational speed ratio $\gamma$ between the front axle rotational speed Nf and the rear axle rotational speed Nr, specifically, $\gamma=Nf/Nr$ is computed.

Further, a rotational speed differential theoretical value $\gamma N0$, which is a theoretical rotational speed differential at the crossing angle Sa, or a rotational speed ratio theoretical value $\gamma 0$, which is a theoretical rotational speed ratio at the crossing angle Sa, is computed.

It may be suitable that the table in which the rotational speed differential theoretical value $\Delta N0$ or the roational speed ratio theoretical value $\gamma 0$ is set is previously stored in the memory 20bm of the brake controller 20b and the rotational speed differential theoretical value $\Delta N0$ or the rotational speed ratio theoretical value $\gamma 0$ is determined based on the table.

Figure 9:
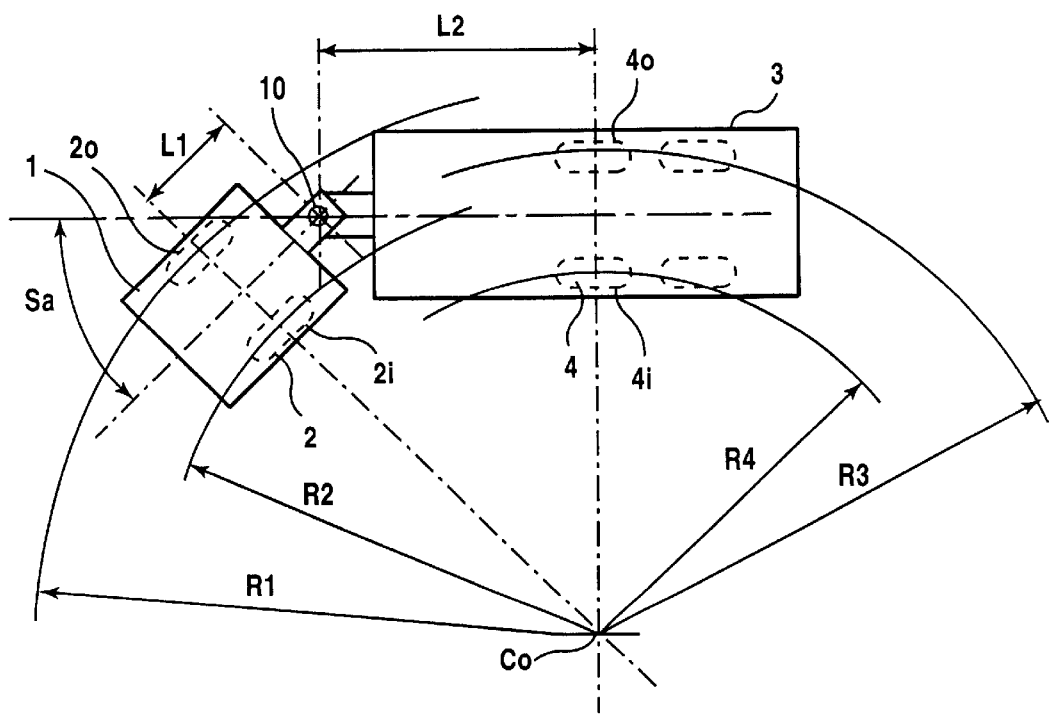
FIG. 9 is an explanatory view of a turning state of the conventional coupled vehicle.

For example, the assumption is made that the coupled vehicle is traveling and the crossing angle Sa is 25 degrees. In the vehicle in which the turning radius R1 of the outer tire of the front wheel 2 shown in FIG. 9 is 14.02 m, the turning radius R2 of the inner tire is 10.62 m, the turning radius R3 of the outer tire of the rear wheel 4 is 13.44 m and the turning radius R2 of the inner tire is 10.04 m, the average turning radius of the front wheels is 12.32 m, and the average turning radius of the rear wheel is 11.74 m. Further, the assumption is made that the total reduction ratio between the input shafts of the front axle 91 and the rear axle 92 (specifically, the front propeller shaft 95 and the rear first propeller shaft 96), and the front wheel 2 and the rear wheel 4 is 20, and the rotational speed of the outer tire of the front wheel 2 is 66 rpm. In the case of the above assumption, the rotational speed of the inner tire is 50 rpm, the rotational speed of the outer tire of the rear wheel 4 is 63 rpm, and the rotational speed of the inner tire is 47 rpm; thus the rotational speed Nf of the front axle 91 is 1160 rpm and the rotational speed Nr of the rear axle 92 is 1100 rpm. Consequently, the rotational speed differential theoretical value $\Delta N0$ being a theoretical rotational speed differential in this case becomes 60 rpm, and the rotational speed ratio theoretical value $\gamma 0$ being a theoretical rotational speed ratio becomes $\gamma 0=12.32/11.74=1.05$.

In step S105, based on the rotational speed differential $\Delta N$ or the rotational speed ratio $\gamma$ computed in step S104, a thermal load Qc of the inter-axle differential lock clutch 71c at the time when the inter-axle differential lock 71 is operated while the rotational speed differential $\Delta N$ or the rotational speed ratio $\gamma$ occurs is computed. The thermal load Qc is determined by a function Fq determined by the rotational speed differential $\Delta N$ or the rotational speed ratio $\gamma$. The function Fq is determined based on the actual measurement value of the heat temperature of the inter-axle differential lock clutch 71c which is caused by the rotational speed differential $\Delta N$ or the rotational speed ratio $\gamma$ while traveling test of the vehicle is performed.

Next, in step S106, a computation is performed to compare the absolute value $|\Delta N-\Delta N0|$ of the differential between the rotational speed differential $\Delta N$ and the rotational speed differential theoretical value $\Delta N0$ with a second rotational speed differential threshold value $\alpha$ of the rotational speed differential. Alternatively, a computation for comparing the absolute value $|\gamma-\gamma 0|$ of the differential between the rotational speed ratio $\gamma$ and the rotational speed ratio theoretical value $\gamma 0$ with a second rotational speed ratio threshold value $\alpha 0$ of the rotational speed ratio is performed.

The threshold value $\alpha$ or $\alpha 0$ is stored in the memory 20bm of the brake controller 20b.

When the absolute value $|\Delta N-\Delta N0|$ of the differential between the rotational speed differential $\Delta N$ and the rotational speed differential theoretical value $\Delta N0$ exceeds the second rotational speed differential threshold value $\alpha$, or the absolute value $|\gamma-\gamma 0|$ of the differential between the rotational speed ratio $\gamma$ and the rotational speed ratio theoretical value $\gamma 0$ exceeds the second rotational speed ratio threshold value $\alpha 0$, a command is given to proceed to step S107. On the other hand, When the absolute value $|\Delta N-\Delta N0|$ of the differential between the rotational speed differential $\Delta N$ and the rotational speed differential theoretical value $\Delta N0$ does not exceed the second rotational speed differential threshold value $\alpha$, or the absolute value $|\gamma-\gamma 0|$ of the differential between the rotational speed ratio $\gamma$ and the rotational speed ratio theoretical value $\gamma 0$ does not exceed the second rotational speed ratio threshold value $\alpha 0$, a command is given to go to step S108.

In step S107, an engine throttle correction demanding signal is transmitted from the brake controller 20b to the engine controller 20c. Then the engine controller 20c transmits an engine throttle correction signal to the engine throttle control device 20d. Thereby the engine throttle control device 20d performs control so as to correct the engine rotational speed by the predetermined value which is stored in the memory 20bm of the brake controller 20b, for example, to lower the engine rotational speed by 100 rpm.

Then, the rotational speed of the engine 50 is automatically reduced by the predetermined value, and the rotational speeds of the front axle 91 and the rear axle 92 are reduced in accordance with that value, thus reducing idling of the axle which is idling on a muddy and soft ground. Accordingly, skidding of the front wheels 2 or the rear wheels 4 reduces, driving force increases, and thus the vehicle travels with stability. As a result, wear in the tires is reduced, useless rotation of the engine 50 is reduced, and the fuel consumption amount is reduced, thus enhancing fuel economy.

In step S108, a comparison between the thermal load Qc of the inter-axle differential lock clutch and a threshold value $\lambda$ of the thermal load is performed. When the thermal load Qc exceeds the threshold value $\lambda$, a command is given to proceed to step S109. When the thermal load Qc does not exceed the threshold value $\lambda$, a command is given to go to step S110. The threshold value $\lambda$ is stored in the memory 20bm of the brake controller 20b. In the above step S108, it is determined whether or not the thermal load Qc, which is caused by the inter-axle differential lock clutch 71c slipping as a result that a force exceeding the coupling force of the inter-axle differential lock clutch 71c works, exceeds the threshold value $\lambda$ being an allowable value.

In step 109, processing is carried out so that the command value i is i =0, and then a command is given to go to step S102. The command value i is made 0 in order that the inter-axle differential lock 71 is released by making the command value i for operating the inter-axle differential lock 71 to be 0 so that the inter-axle differential lock clutch 71c is protected, when a load on the inter-axle differential lock clutch 71c is large to cause a greater amount of heat while the interaxle differential lock 71 is operating.

In step S110, in order to determine the existence of a wheel skid, a computation for comparing the absolute value $|\Delta N-\Delta N0|$ of the differential between the rotational speed differential $\Delta N$ and the rotational speed differential theoretical value $\Delta N0$ with a first rotational speed differential threshold value $\beta$ of the rotational speed differential is carried out. Alternatively, a computation for comparing the absolute value $|\gamma-\gamma 0|$ of the differential between the rotational speed ratio $\gamma$ and the rotational speed ratio theoretical value $\gamma 0$ with a first rotational speed ratio threshold value $\beta 0$ of the rotational speed ratio is carried out. The threshold value $\beta$ or $\beta 0$ is stored in the memory 20bm of the brake controller 20b.

Here, the second rotational speed differential threshold value $\alpha$ being a predetermined threshold value is set to be a larger value than the first rotational speed differential threshold value $\beta$ and the second rotational speed ratio threshold value $\alpha 0$ is set to be a larger value than the first rotational speed ratio threshold value $\beta 0$.

When the absolute value $|\Delta N-\Delta N0|$ of the differential between the rotational speed differential $\Delta N$ and the rotational speed differential theoretical value $\Delta N0$ exceeds the first rotational speed differential threshold value $\beta$, or the absolute value $|\gamma-\gamma 0|$ of the differential between the rotational speed ratio $\gamma$ and the rotational speed ratio theoretical value $\gamma 0$ exceeds the first rotational speed ratio threshold value $\beta 0$, a command is given to proceed to step S111. On the other hand, when the absolute value $|\Delta N-\Delta N0|$ does not exceed the first rotational speed differential threshold value $\beta$, or the absolute value $|\gamma-\gamma 0|$ does not exceed the first rotational speed ratio threshold value $\beta 0$, a command is given to go to step S113.

In step S111, it is determined that a wheel skid exists and either the front axle 91 or the rear axle 92 is idling, and thus an inter-axle differential lock signal for operating the inter-axle differential lock 71 is transmitted to the transmission controller 20a from the brake controller 20b.

In step S112, on receiving the inter-axle differential lock signal for operating the inter-axle differential lock 71, the transmission controller 20*a* sets the command value i to be i=i+Δi. Specifically, the value of the command value i is increased by a predetermined value Δi, and a current of the corresponding magnitude to the command value i+Δi is passed to the inter-axle differential lock valve 36. The predetermined value Δi is stored in the memory 20*am* in the transmission controller 20*a*.

The inter-axle differential lock valve 36 feeds pressure oil of a pressure which is determined by the current of a magnitude corresponding to the command value i+Δi to the inter-axle differential lock 71 to operate the inter-axle differential lock 71. The inter-axle differential lock clutch 71*c* of the inter-axle differential lock 71 is coupled with a force corresponding to the pressure of the pressure oil. After step S112, a command is given to return to step S102 to repeat the same processing as above.

In step S113, it is determined that no wheel skid exists and neither the front axle 91 nor the rear axle 92 is idling, and thus the inter-axle differential lock signal for operating the inter-axle differential lock 71, which is transmitted to the transmission controller 20*a* from the brake controller 20*b*, is cut to be OFF.

In step S114, responding to the inter-axle differential lock signal being OFF and cut, the transmission controller 20*a* sets the command value to be i=i−Δi. Specifically, the value of the command value i is decreased by the predetermined value Δi, and a current of the corresponding magnitude to the command value "i−Δi" is passed to the inter-axle differential lock valve 36. The inter-axle differential lock valve 36 decreases the pressure of the pressure oil fed to the inter-axle differential lock 71 for operating the inter-axle differential lock 71 in correspondence to the current. The inter-axle differential lock clutch 71*c* of the inter-axle differential lock 71 decreases the coupling force in accordance with the pressure of the pressure oil. After step S114, a command is given to return to step S102 to repeat the same processing as above.

Accordingly, when the coupled vehicle turns during traveling on a wasteland such as a muddy ground (See FIG. 9), when a rotational speed differential occurs between the front axle 91 and the rear axle 92 and when the absolute value of the differential between the rotational speed differential which has occurred and the theoretical value of the rotational speed differential exceeds the predetermined value, or when the absolute value of the differential between the rotational speed ratio and the theoretical value of the rotational speed ratio exceeds a predetermined value, the inter-axle differential lock 71 is automatically operated. Thereby, the front axle 91 or the rear axle 92 does not idle and the front wheels 2 or the rear wheels 4 do not skid, thus making it possible to smoothly turning the vehicle. Consequently, driving operability of the coupled vehicle is improved. On the other hand, when the absolute value of the differential between the rotational speed differential between the front axle 91 and the rear axle 92, and the theoretical value of the rotational speed differential does not exceed the predetermined value, or the absolute value of the differential between the rotational speed ratio and the theoretical value of the rotational speed ratio does not exceed the predetermined value, the inter-axle differential lock 71 does not operate, thus increasing durability of the drive unit of the coupled vehicle.

In the above steps S111 and S112, when the inter-axle differential lock signal is transmitted to the transmission controller 20*a*, the inter-axle differential lock signal is ON as shown in FIG. 3(*b*). At this time, if the command value i=0, the command value i becomes Δi as shown in FIG. 3(*a*).

Figure 2:
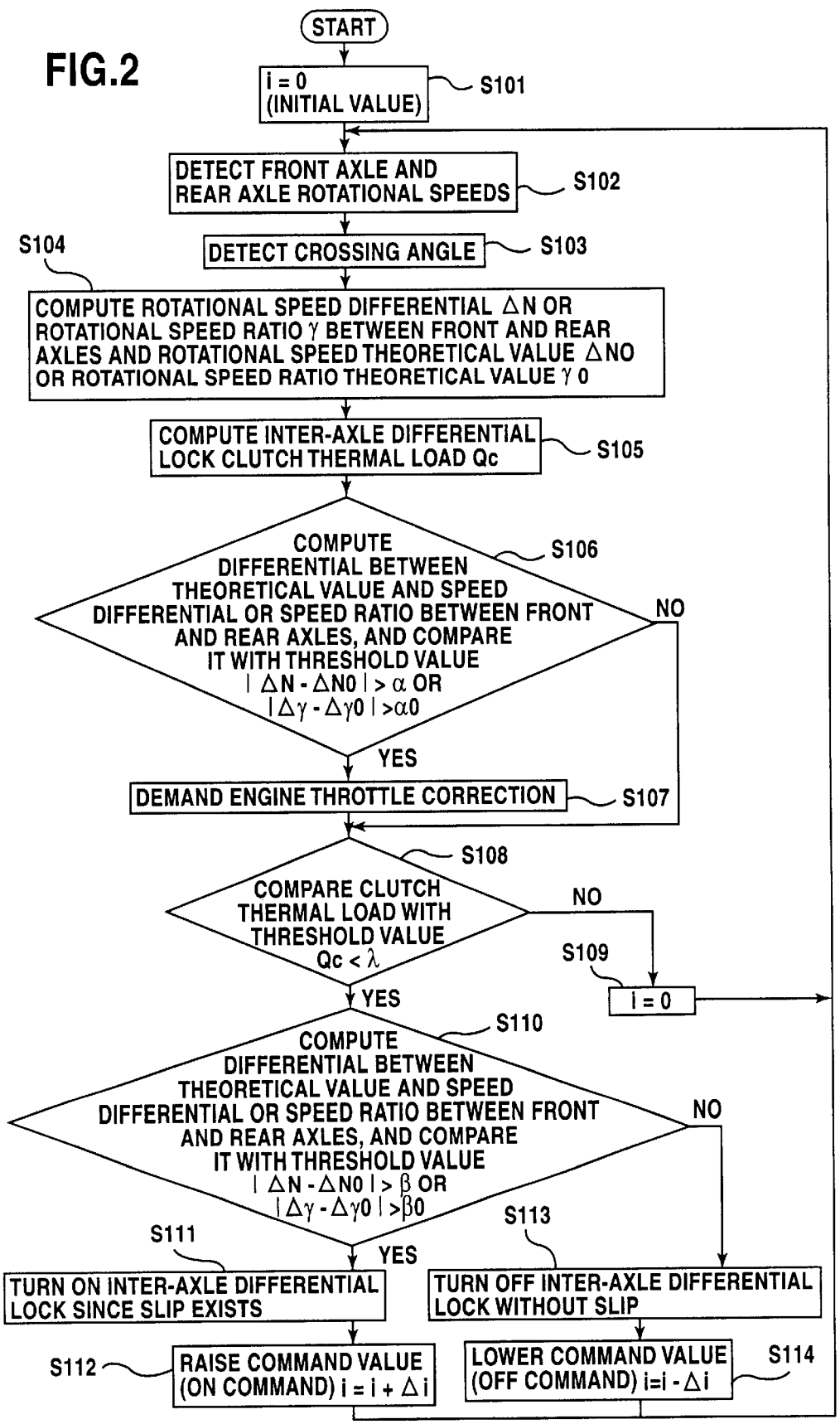
FIG. 2 is a flow chart explaining a control in the first and a second embodiment of the present invention.

During the period from a time t1 to a time t2, if the inter-axle differential block signal is "ON command", the command value i is increased stepwise by the predetermined value Δi for each cycle time Δt per processing according to the flowchart in FIG. 2, for example, for every 0.1 S. On the other hand, during a period from the time t2 to a time t3, if the inter-axle differential block signal is "OFF command", processing is carried out to decrease the command value i stepwise by the predetermined value Δi for each processing cycle time Δt. Accordingly, when the inter-axle differential lock signal is ON, the command value i is not abruptly increased, and thus the inter-axle differential lock 71 is not operated abruptly. When the inter-axle differential block signal is OFF, the command value i is not abruptly decreased to be 0, and thus the inter-axle differential lock 71 does not abruptly cease operating.

An object of the above is to prevent a shock occurring to the vehicle, which is caused by a sudden change in the pressure of the pressure oil fed to the inter-axle differential lock clutch 71*c* of the inter-axle differential lock 71. A so-called hunting phenomenon in which the inter-axle differential lock 71 repeatedly starts operating and ceases operating in a short time is eliminated. Consequently, the durability of the drive unit of the vehicle increases and driving operability is improved.

Assume that the pressure of the pressure oil for coupling the inter-axle differential lock clutch 71*c* so that it does not slip is, for example, 2.94 MPa. In this case, instead of abruptly increasing the pressure to be 2.94 MPa from 0 MPa, the pressure is increased to be, for example, 0.49 MPa at first, and if the inter-axle differential lock signal is ON even 0.1 S later, the pressure is increased to be 0.98 MPa to thereby increase the pressure of the pressure oil stepwise. The pressure is decreased in the same way as above. If the pressure becomes maximum pressure (for example, 2.94 MPa) while the pressure is increasing, or if the pressure becomes minimum pressure (for example, 0 MPa) while the pressure is decreasing, the pressure is maintained.

Figure 4:
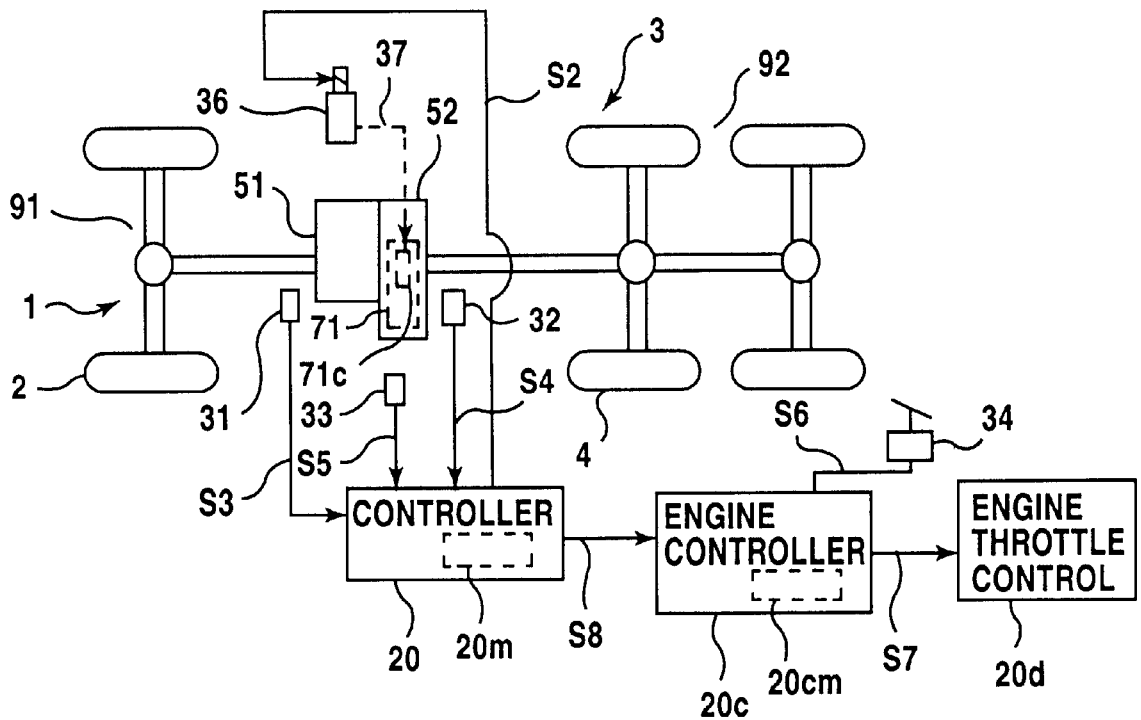
FIG. 4 is a block diagram of a hardware configuration of the second embodiment of the present invention.
Figure 5:
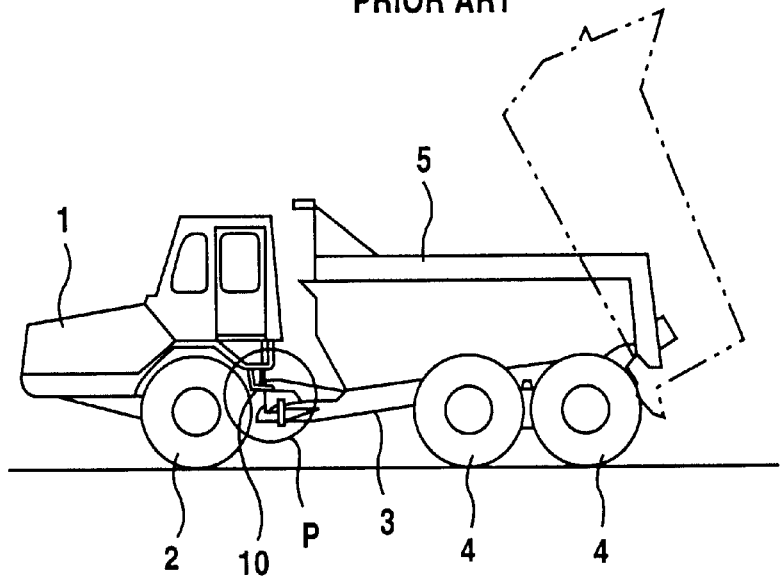
FIG. 5 is a side view of a conventional articulated dump truck.
Figure 6:
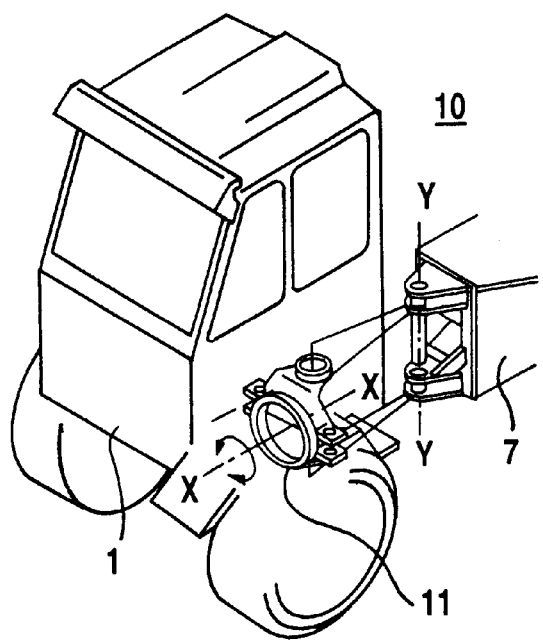
FIG. 6 is the portion P in FIG. 5, and is an explanatory view of a coupling device.
Figure 7:
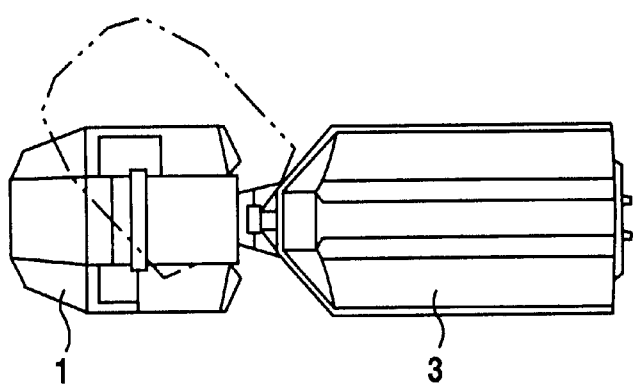
FIG. 7 is a plan view of the dump truck in FIG. 5.

Next, a second embodiment will be explained with reference to FIG. 4. The same elements as in the first embodiment are given the identical numerals and symbols, and the detailed explanation thereof will be omitted. FIG. 4 shows a hardware configuration of a front and rear wheel load distribution control unit for a coupled vehicle of the second embodiment.

The signal line S2 for transmitting a signal for operating the inter-axle differential lock valve 36 is connected to the inter-axle differential lock valve 36 disposed at the transmission 51 from the controller 20 disposed at the front vehicle body 1. To the controller 20, connected are the signal line S3, to which a rotation signal from the front axle rotation sensor 31 provided in the vicinity of the output shaft in front of the transfer device 52 to detect the rotational speed Nf of the input shaft of the front axle 91 is inputted, and the signal line S4 to which a rotation signal from the rear axle rotation sensor 32 provided in the vicinity of the output shaft at the rear of the transfer device 52 to detect the rotational speed Nr of the rear axle 92 is inputted.

Further, to the controller 20, connected is the signal line S5 to which a crossing angle signal from the crossing angle sensor 33 provided in the vicinity of the coupling element 10 for the front and rear vehicle bodies 1 and 3 is inputted. The controller 20 carries out filtering processing for cutting noises in the rotation signals, and always monitors the rotational speeds of the front axle 91 and the rear axle 92. The controller 20 transmits a signal to operate the inter-axle differential lock valve 36 in response to the rotational signal and the crossing signal, and transmits an engine throttle correction signal to the engine controller 20c disposed at the front vehicle body 1.

A signal line S8 to which an engine throttle correction signal is inputted from the controller 20 is connected to the engine controller 20c. The controller 20 consists of a processor such as a microcomputer, a high-speed math processor or the like, and has a predetermined erasable memory 20m (so-called RAM) in which thresholds and the like are stored.

As explained above, the controller 20 and the inter-axle differential lock valve 36 constitute control means for operating the inter-axle differential lock 71 provided at the transfer device 52 connecting to the transmission 51. A configuration in which the engine controller 20c is added to the aforesaid control means constitutes control means for controlling the speed of the engine 50 in addition to the function of operating the inter-axle differential lock 71. The control means may not be separate controllers, and it goes without saying that the control means may be an integral-type of controller including the respective functions.

Next, the operation of the second embodiment of the front and rear load distribution control unit for the coupled vehicle will be explained with a flowchart in FIG. 2. It should be noted that the explanation of the same operations as in the first embodiment will be omitted.

First, in step S101, in the controller 20, the command value i is initialized to be "0". The operations in steps S102 to S106 are the same as those in the first embodiment. It may be suitable that the table, in which the rotational speed differential theoretical value $\Delta N0$ or the rotational speed ratio theoretical value $\gamma 0$ at the crossing angle Sa is set, is previously stored in the memory 20m of the controller 20 and the rotational speed differential theoretical value $\Delta N0$ or the rotational speed ratio theoretical value $\gamma 0$ is determined based on the table. The threshold value $\alpha$ or $\alpha 0$ is stored in the memory 20m of the controller 20.

In step S107, an engine throttle correction demanding signal is transmitted from the controller 20 to the engine controller 20c. Then the engine throttle control device 20d performs control so as to correct the engine speed by the predetermined value which is stored in the memory 20m of the controller 20, for example, to reduce the engine speed by 100 rpm. The operations in steps S108, S109 and S110 are the same as in the first embodiment. It should be noted that the threshold value $\lambda$ and the threshold value $\beta$ or $\beta 0$ are stored in the memory 20m of the controller 20.

In step S111, it is determined that a wheel skid exists and either the front axle 91 or the rear axle 92 is idling, and thus an inter-axle differential lock signal for operating the inter-axle differential lock 71 inside is turned ON by the controller 20.

In step S112, as a result that the inter-axle differential lock signal for operating the inter-axle differential lock 71 becomes ON, the controller 20 sets the command value i to be i=i+$\Delta$i to increase the value of the command value i by a predetermined value $\Delta$i, and a current of the corresponding magnitude to the command value i+$\Delta$i is passed to the inter-axle differential lock valve 36. The predetermined value $\Delta$i is stored in the memory 20m in the controller 20. Subsequently, a command is given to return to step S102 to repeat the same processing as above.

When proceeding to step S113, it is determined that no wheel skid exists and neither the front axle 91 nor the rear axle 92 is idling, and thus the controller 20 turns OFF the inter-axle differential lock signal for operating the inter-axle differential lock 71. In step S114, as a result of the inter-axle differential lock signal being OFF, the controller 20 sets the command value to be i=i−$\Delta$i to decrease the value of the command value i by the predetermined value $\Delta$i, and a current of the corresponding magnitude to the command value "i−$\Delta$i" is passed to the inter-axle differential lock valve 36. Subsequently, a command is given to return to step S102 to repeat the same processing as above.

Figure 3A:
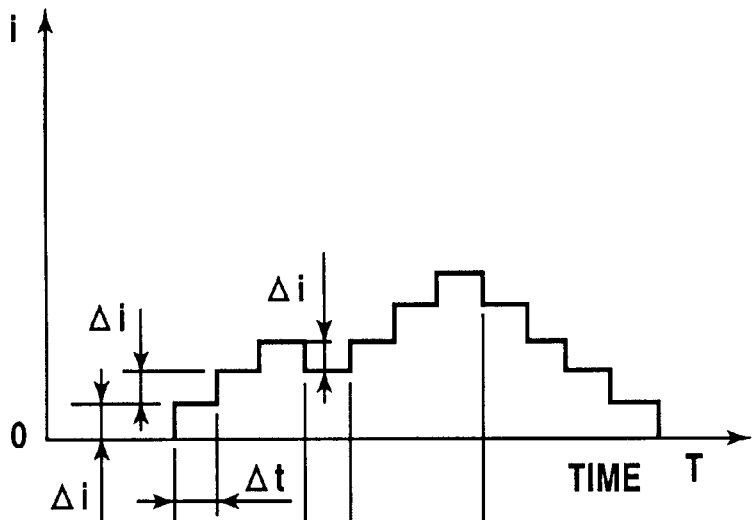
FIG. 3 is an explanatory diagram of the operation of a control unit in the first embodiment of the present invention.
Figure 3B:
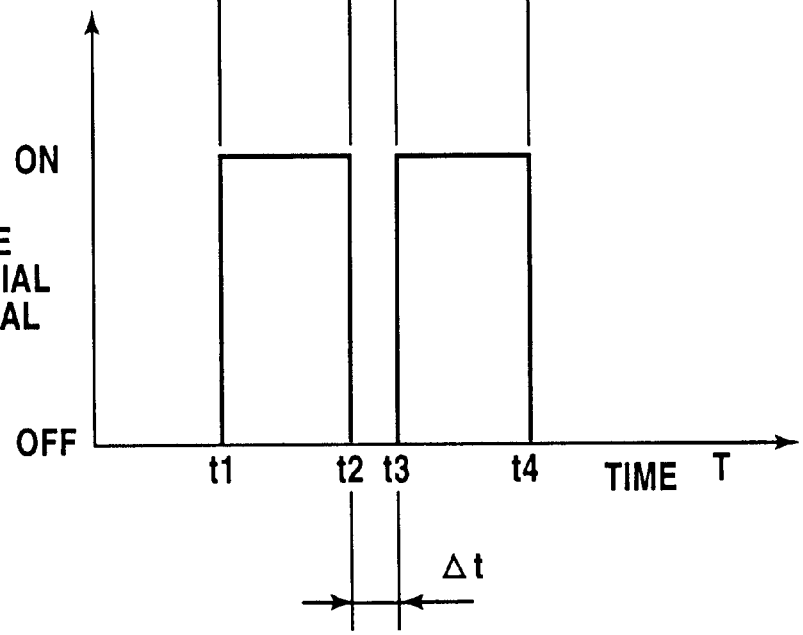

In steps S111 and S112, when the inter-axle differential lock signal is turned ON as shown in FIG. 3(b) by the controller 20, if the command value i is i=0, the command value i becomes $\Delta$i as shown in FIG. 3(a). The other operations and effects are the same as in the first embodiment, and therefore the explanation thereof will be omitted.

As explained thus far, according to the present invention, when the coupled vehicle makes a turn during traveling on a wasteland such as a muddy ground, the inter-axle differential lock 71 is automatically operated. Thereby, the front axle 91 or the rear axle 92 does not idle and the front wheels 2 or the rear wheels 4 do not skid. Consequently, the vehicle can turn smoothly, and thus driving operability of the coupled vehicle is improved. When the absolute value of the differential between the rotational speed differential between the front axle 91 and the rear axle 92, and the theoretical value of the rotational speed differential does not exceed a predetermined value, or the absolute value of the differential between the rotational speed ratio and the theoretical value of the rotational speed ratio does not exceed a predetermined value, the inter-axle differential lock 71 does not operate. As a result, the inter-axle differential being a differential device between the front and rear axles is operated properly to absorb the rotational speed differential between the front and rear axles, thus increasing durability of the driving unit of the coupled vehicle.

When the absolute value $|\Delta N - \Delta N0|$ of the differential between the rotational speed differential $\Delta N$ and the rotational speed differential theoretical value $\Delta N0$ exceeds the rotational speed differential threshold value $\alpha$, or the absolute value $|\gamma - \gamma 0|$ of the differential between the rotational speed ratio $\gamma$ and the rotational speed ratio theoretical value $\gamma 0$ exceeds the rotational speed ratio threshold value $\alpha 0$, a control is carried out so as to automatically reduce the engine speed by the predetermined value. Then, the engine speed is reduced by the predetermined value, and the rotational speeds of the front axle and the rear axle are reduced in accordance with that value, thus reducing idling of the axle which is idling on a muddy and soft ground. Accordingly, skidding of the front wheels 2 or the rear wheels 4 reduces, driving force increases, and thus the vehicle travels with stability. As a result, wear of the tires reduces, useless rotation of the engine reduces, and the fuel consumption amount reduces, thus enhancing fuel economy.

Further, even when the inter-axle differential lock signal is ON, the command value i is increased stepwise, and meanwhile when the inter-axle differential block signal is OFF, the command value i is decreased stepwise. Thus the inter-axle differential lock 71 does not abruptly start operating or cease operating. Consequently, a shock does not occur to the vehicle, which is caused as a result that the inter-axle differential lock 71 suddenly becomes operational or non-operational, and a so-called hunting phenomenon in which the inter-axle differential lock 71 repeatedly operates and stops operating in a short time is eliminated, thus increasing the durability of the drive unit of the vehicle and improving driving operability.

What is claimed is:

1. A front and rear wheel load distribution control unit for a coupled vehicle with a front vehicle and a rear vehicle being coupled, including an inter-axle differential lock between a front axle and a rear axle for eliminating a rotational differential between said front axle and said rear axle, said control unit comprising:

a crossing angle detecting sensor for detecting a crossing angle of said front vehicle and said rear vehicle;

a front axle rotation sensor for detecting rotation of said front axle;

a rear axle rotation sensor for detecting rotation of said rear axle; and control means for operating said inter-axle differential lock in response to a crossing angle signal from said crossing angle detecting sensor, a rotation signal from said front axle rotation sensor, and a rotation signal from said rear axle rotation sensor.

2. A front and rear wheel load distribution control unit for a coupled vehicle with a front vehicle and a rear vehicle being coupled, including an inter-axle differential lock between a front axle and a rear axle for eliminating a rotational differential between said front axle and said rear axle, said control unit comprising:

a crossing angle detecting sensor for detecting a crossing angle of said front vehicle and said rear vehicle;

a front axle rotation sensor for detecting rotation of said front axle;

a rear axle rotation sensor for detecting rotation of said rear axle; and control means which obtains a rotational speed differential between said front axle and said rear axle and a theoretical value of the rotational speed differential between said front axle and said rear axle according to the crossing angle, or which obtains a rotational speed ratio between said front axle and said rear axle and a theoretical value of the rotational speed ratio between said front axle and said rear axle according to the crossing angle, based on a crossing angle signal from said crossing angle detecting sensor, a rotation signal from said front axle rotation sensor, and a rotation signal from said rear axle rotation sensor, and which operates said inter-axle differential lock when an absolute value of the differential between the obtained rotational speed differential and the obtained theoretical value of the rotational speed differential exceeds a first rotational speed differential threshold value, or when an absolute value of the differential between the obtained rotational speed ratio and the obtained theoretical value of the rotational speed ratio exceeds a first rotational speed ratio threshold value.

3. The front and rear wheel load distribution control unit for the coupled vehicle in accordance with claim 2, wherein said control means further output a signal for reducing an engine speed of said coupled vehicle by a predetermined value when an absolute value of the differential between the obtained rotational speed differential and the obtained theoretical value of the rotational speed differential exceeds a second rotational speed differential threshold value which is larger than said first rotational speed differential threshold value, or when an absolute value of the differential between the obtained rotational speed ratio and the obtained theoretical value of the rotational speed ratio exceeds a second rotational speed ratio threshold value which is larger than said first rotational speed ratio threshold value.

4. The front and rear wheel load distribution control unit for the coupled vehicle in accordance with claim 2 or claim 3, wherein said control means increase and decrease the magnitude of an operation signal for said inter-axle differential lock stepwise.

* * * * *